United States Patent

[11] 3,573,352

[72] Inventor Yasuhiro Fujita
Kyoto, Japan
[21] Appl. No. 719,420
[22] Filed Apr. 8, 1968
[45] Patented Apr. 6, 1971
[73] Assignee Matsushita Electronics Corporation
Osaka, Japan
[32] Priority Apr. 13, 1967
[33] Japan
[31] 42/23908

[54] COLOR TONE ADJUSTMENT FOR COLOR TV RECEIVER
11 Claims, 11 Drawing Figs.

[52] U.S. Cl. ........................................................ 178/5.4
[51] Int. Cl. ........................................................ H04n 9/32
[50] Field of Search ........................................... 178/5.4, 5.2, 5.4 (T), 5.4 (MC), 5.4 (ACC)

[56] References Cited

UNITED STATES PATENTS

| | | | |
|---|---|---|---|
| 2,931,856 | 4/1960 | Davis et al. .................. | 178/5.4T |
| 3,479,448 | 9/1969 | Kollsman..................... | 178/5.2 |

*Primary Examiner*—Robert L. Griffin
*Assistant Examiner*—Richard P. Lange
*Attorney*—Stevens, Davis, Miller and Mosher

ABSTRACT: This specification discloses a color television receiver wherein the white balance controlling reference color illumination occurring in a portion of the fluorescent screen is passed through three primary-color filters so as to be separated into "red," "green" and "blue" light rays which are irradiated onto photosensitive elements so that variations in the filtered light rays are converted to electrical quantities to be fed back to the video circuit, thereby directly or indirectly controlling the color reproduction signal voltage to be applied to the color picture tube.

INVENTOR
YASUHIRO FUJITA
BY Stevens, Davis, Miller & Mosher
ATTORNEYS

INVENTOR
YASUHIRO FUJITA
BY Stevens, Davis, Miller & Mosher
ATTORNEYS

INVENTOR

YASUHIRO FUJITA

BY Stevens, Davis, Miller & Mosher

ATTORNEYS

INVENTOR
YASUHIRO FUJITA
BY
ATTORNEYS

COLOR TONE ADJUSTMENT FOR COLOR TV RECEIVER

This invention relates to a three-electron gun type color television receiver, and more particularly it pertains to improvements in such color television receiver for making it possible to control the deviation from the normal state of the color tone which stems from changes in the characteristics of vacuum tubes, especially of the color difference amplifier due to aging and/or changes in the various characteristics of the color picture tube per se due to aging.

At the present time, most of the commercially available color television receivers use a shadow-mask-type color picture tube provided with three electron guns. Normally, in such color picture tube, a luminance signal or Y signal is supplied to the cathodes of all the electron guns, and three color difference signals R—Y, G—Y and B—Y are supplied to the grids of the red, green and blue electron guns. In order to produce accurate colors in a color television receiver of such system as described above, it is required that the respective color difference signals be amplified without distortion so as to be supplied to the picture tube. For the purpose of keeping the DC level of each color difference signal at a proper value, attempts have conventionally been made to use an amplifier called "blanker" thereby controlling the color difference output so that the latter becomes zero during the horizontal retrace time. With such method, however, it is still impossible to prevent unbalance among the color difference signals which stems from the fact that the operating points of the vacuum tubes are shifted as a result of variations in the constants of the vacuum tubes due to aging. In order to prevent such unbalance among the color difference signals which stems from the fact that the operating points of the tubes are shifted, attempts have been made to AC-couple the color difference amplifiers and connect clamping circuits each comprising a diode to the grids of the cathode ray tube thereby preventing the DC operating points of the vacuum tubes from being shifted. By such method, it is possible to substantially prevent changes in color stemming from the fact that the operating points of the vacuum tubes of the color difference amplifiers are shifted, but it is impossible to prevent changes in color stemming from variations in the characteristics of the picture tube due to aging.

It is a primary object of this invention to solve the aforementioned problems.

Another object of this invention is to provide a color television receiver wherein the final color balance on the viewing screen of the picture tube can be maintained in the best possible state irrespective of variations in characteristics occurring in any of the vacuum tubes and picture tube so that the color balance sensed by the viewer can be kept in the best possible state.

Other objects, features and advantages of the present invention will become apparent from the following description taken in conjunction with the accompanying drawings, in which.

Figure 4:
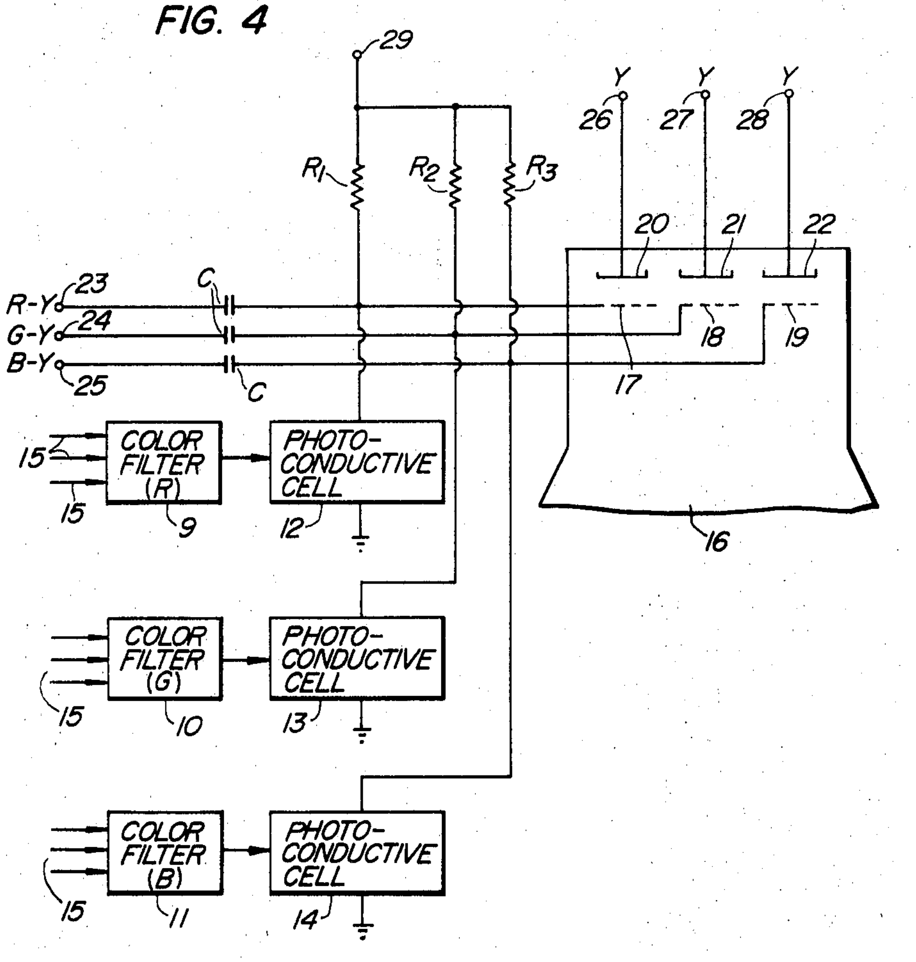
Figure 5:
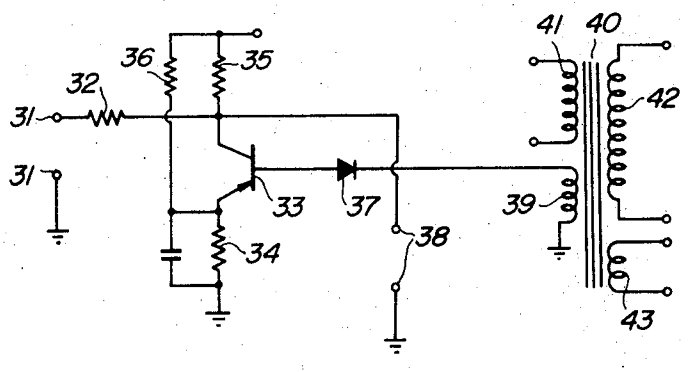
Figure 6:
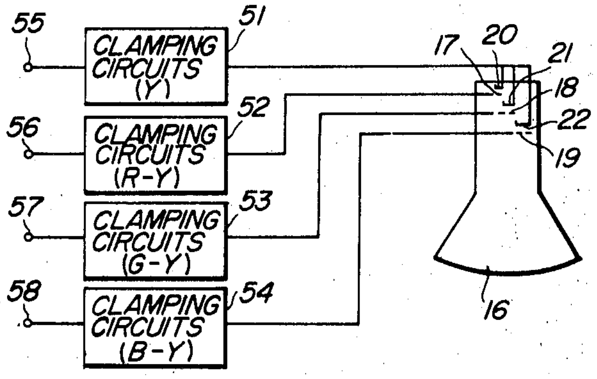

FIGS. 3*a* through 3*f* are waveform views useful for explaining the present invention;

FIG. 4 is a view showing part of the circuit of the device embodying the present invention;

FIG. 5 is a view showing the signal clamping circuit provided in the device of this invention; and FIG. 6 is a view showing the system for transmitting signals to the color picture tube in the device embodying the present invention.

Figure 1:
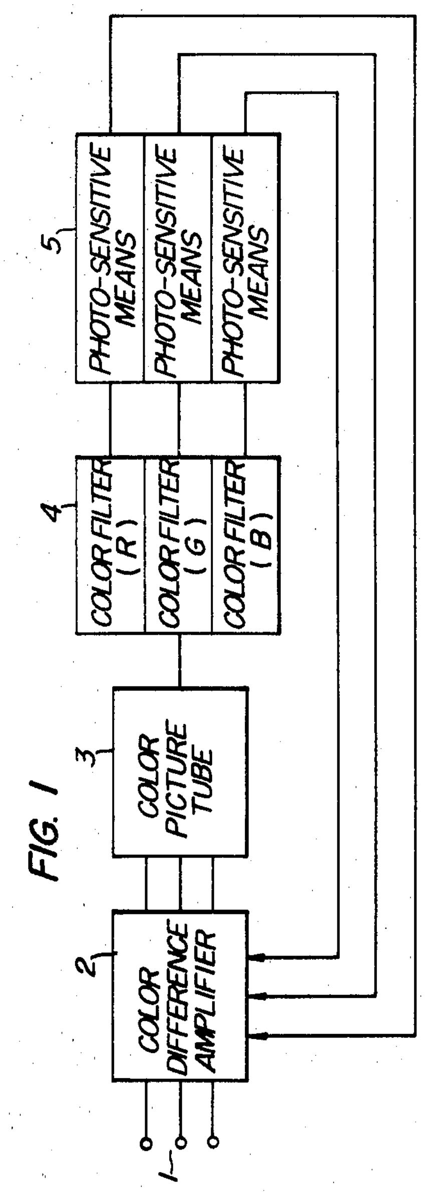
FIG. 1 is a block diagram showing the device according to an embodiment of this invention.

Referring first to FIG. 1, color difference signals are supplied from terminals 1 to color difference amplifiers 2 so as to be amplified therein, and then they are supplied to a color picture tube 3.

The reference numeral 4 represents a three-primary color filter for filtering a white balance controlling reference color illumination produced at the viewing screen of the color picture tube 3, thereby separating the reference color illumination into red, green and blue light rays. The light rays thus separated are projected onto photosensitive means 5 which may be composed of photoconductive cells for the respective colors, for example. Variations in the resistances of the photosensitive means corresponding to the amounts of the filtered light rays are fed back to the color amplifiers 2, thus directly or indirectly controlling the bias voltage applied to the grids of the color picture tube which tends to be changed due to variations in the color difference signals.

Figure 2:
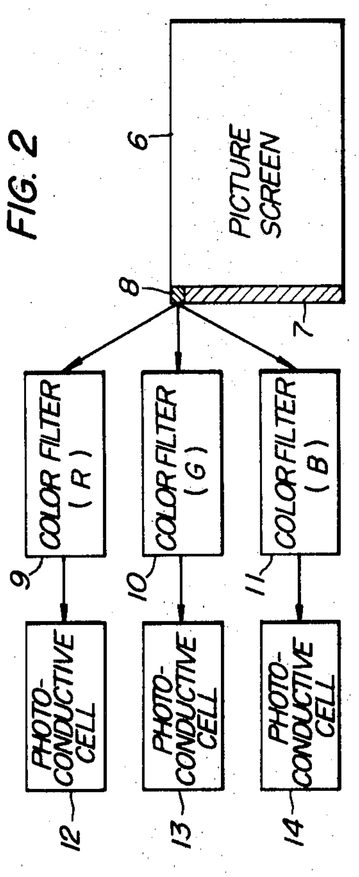
FIG. 2 is a view useful for explaining the operation of the device as shown in FIG. 1.

FIG. 2 shows an example of the means for producing a color reproduction controlling signal which is used to perform the aforementioned controlling operation, wherein a reference color illumination is produced at a small portion 8 of an end portion 7 of viewing screen 6 of the picture tube and filtered by means of red, green and blue color filters 9, 10 and 11, which correspond to the element generally indicated at 4 in FIG. 1, so that outputs corresponding to the three primary colors are separately detected. The separate filtered light rays are then irradiated onto photoconductive cells 12, 13 and 14, which correspond to the element generally indicated at 5 in FIG. 1, so that the resistances of the cells are changed in accordance with the quantities of the filtered light rays irradiated thereonto.

Figures 3A, 3B, 3C, 3D, 3E, 3F:
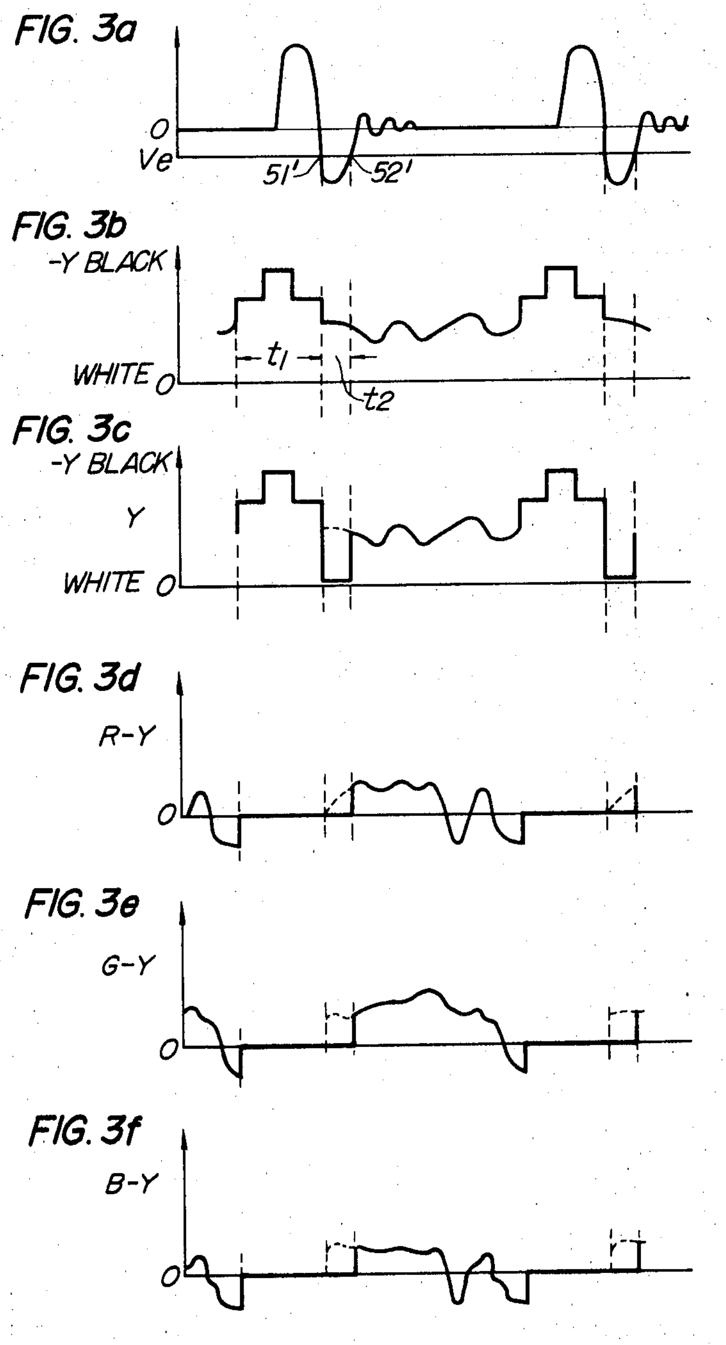

The resistance variations thus produced are always fed back directly or indirectly to the red green and blue grids of the picture tube as described above in connection with FIG. 1, thereby achieving proper color reproduction. The formation of that portion in the viewing screen of the color picture tube which can produce white balance controlling illumination as illustrated in FIG. 2 can be realized by the use of such video signals as shown in FIG. 3. FIGS. 3*a* through 3*f* are views showing the waveforms at the portions, with all the horizontal time-axes in correspondence. FIG. 3*a* shows flyback pulses appearing in a fourth coil coupled to a flyback transformer, FIG. 3*b* shows the luminance signal Y contained in video signal, FIG. 3*c* shows pulses obtained by clamping the luminance signal by means of a clamping circuit which will be described later, FIG. 3*d* shows the clamped color difference signal (R—Y) supplied to the red grid, FIG. 3*e* shows the clamped color difference signal (G—Y) supplied to the green grid, and FIG. 3*f* shows the clamped color difference signal (B—Y) supplied to the blue grid.

The respective clamped signals described above are produced with the aid of the clamping circuit as shown by way of example in FIG. 5, wherein the reference numeral 31 represents input terminals, 32 a resistor, 33 a transistor connected in common-emitter arrangement, 34 an emitter bias circuit for the transistor 33, 35 a collector load of the transistor 33, 36 a resistor for determining the operating point of the transistor, 37 a diode, 38 signal output terminals led from the collector electrode terminal of the transistor 33, 39 the fourth coil of the flyback transformer which is connected with the base of the transistor 33 through the diode 37, 40 the flyback transformer, 41 a primary coil coupled to the flyback circuit, 42 a high voltage coil connected with a high voltage generating circuit, and 43 a secondary coil coupled to the flyback coil. With such circuit arrangement, a signal is applied to the base of the transistor 33 through the diode 37 during the negative cycle of the flyback pulses, but the transistor 33 is rendered conductive when the flyback pulses go more negative than the emitter voltage or during the interval between points of time 51 and 52 in FIG. 3*a*. Thus, an input signal applied between the input terminals 31 is clamped during said interval before it appears at the output terminals 38. That is, if a video luminance signal such as shown in FIG. 3*b* is applied between the input terminals 31, a signal which has been clamped for an interval $t_2$ *subsequent to an interval* $t_1$ corresponding to the period of the synchronizing pulse will appear at the output terminals 38 as shown by a solid line in FIG. 3*c*.

Similarly, if the signals (R—Y), (G—Y) and (B—Y) are supplied to the input terminals 31 of this circuit, color difference signals clamped as shown by solid lines in FIGS. *3d*, *3e* and *3f* will appear at the output terminals 38, respectively. In FIGS. *3c* to *3f*, broken curves show the waveforms prior to being clamped.

FIG. 6 shows the main portion of the receiver wherein a clamping circuit is incorporated in each signal transmission system. In FIG. 6, the reference numeral 16 represents a three-gun-type color picture tube, 17, 18 and 19 the grids of red, green and blue electron guns, respectively, and 20, 21 and 22 the cathodes of the red, green and blue electron guns, respectively. The reference numerals 51, 52, 53 and 54 denote clamping circuits for the luminance signal Y, signal (R—Y), signal (G—Y) and signal (B—Y), respectively. Such clamping circuits may have the arrangement as shown in FIG. 5, for example. The reference numerals 55, 56, 57 and 58 represent input terminals for the luminance signal, signal (R—Y), signal (G—Y) and signal (B—Y), respectively.

If the signals are clamped by means of the above circuits, then an elongated white portion of a width corresponding to the interval $t_2$ *will appear in the viewing screen of the picture tube 16, as indicated at 7 in FIG. 2, because the respective color difference signals and the luminance signal are clamped so that a luminance of a predetermined level occurs. In order to minimize loss of information, the clamping may be effected during one interval either at the start or end of the vertical scanning period. This can be achieved by further controlling the clamping circuits by the vertical deflection synchronizing signal.*

In this way, the white balance controlling reference color illumination is produced at a portion of the screen of the picture tube, and the color reproduction by the white balance controlling reference color illumination is effected as shown in FIG. 4.

More specifically, the clamped color difference signals (R—Y), (G—Y) and (B—Y) are supplied from terminals 23, 24 and 25 to the red, green and blue grids of the picture tube 16 through capacitors C, respectively, and the clamped luminance signal Y is supplied from terminals 26, 27 and 28 to the red, green and blue cathodes of the picture tube, respectively. Furthermore, since the reference signal is inserted in these signals, the white color reference illumination is produced at part of the screen of the picture tube. The white balance controlling reference color illumination 15 is projected into red, green and blue color filters 9, 10 and 11 provided externally of the picture tube, as described above in connection with FIG. 1. Thus, the light ray filtered by the red color filter 9 is irradiated onto the photoconductive cell 12, the light ray filtered by the green color filter 10 onto the photoconductive cell 13, and the light ray filtered by the blue color filter 11 into the photoconductive cell 14.

Each of these photoconductive cells has its one terminal connected with one of the respective grids of the picture tube and the other terminal grounded, as shown in FIG. 4. In FIG. 4, $R_1$, $R_2$ and $R_3$ are grid bias resistors connected with a grid bias supply terminal 29.

With the circuit having the foregoing arrangement embodying the present invention, if the three primary colors of the white balance controlling reference color illumination is properly controlled, then the quantities of the filtered light rays irradiated onto the photoconductive cells 12, 13 and 14 become equal to each other and the bias voltage applied to the grids of the picture tube is maintained at a constant value which is determined by the resistances of the photoconductive cells and grid bias resistors, so that proper color reproduction can be achieved. If, however, the bias voltage applied to the red grid is changed in the positive direction due to some causes so that the picture becomes reddish as a whole, only the light ray irradiated onto the photoconductive cell 12 through the red color filter 9 increases in quantity so that the resistance of the photoconductive cell 12 decreases accordingly. Consequently, the bias voltage applied to the red grid is changed in such a direction that it decreases, so that the balance of red, green and blue is properly corrected. Thus, proper color reproduction is achieved. Of course, this is also true of the green and blue grids 18 and 19. Even if the bias voltages are changed in the negative direction, a similar automatic control operation can be performed through the exact reversal of the above-described operation. Although, in the foregoing, description has been made of the case where the photoconductive cells are connected directly to the grids of the color picture tube, it is also possible that the photoconductive cells may be inserted in the respective amplifier circuits for the four signals, for example. That is, such cells may be connected with any portion where their relationship in connection with respect to the video circuit is such that they can control the output voltage.

As will be appreciated from what has been described above, in the color television receiver according to the present invention, white balance controlling reference color illumination produced at the screen of the picture tube is filtered by red, green and blue color filters so as to be separated into three primary-color light rays as viewed on the side of the viewer, and the grid biases for the picture tube are controlled by the resistances of the photosensitive elements which depend upon the quantities of light rays irradiated thereonto and grid bias resistances of the picture tube, so that proper control can always be made of variations in color which stem from variations in the color difference signals due to aging or the like of vacuum tubes used in the respective color difference amplifiers, deterioration in the characteristics of the picture tube per se due to aging, etc., thereby making it possible to produce a picture with proper color reproduction on the screen.

As photosensitive elements, use may be made of either phototransistors or photodiodes. Thus, the color balance control can be achieved as described above, by controlling the bias or amplification factor of the video amplifier in accordance with electrical signals produced by said elements or directly or indirectly controlling the grid or cathode circuit of the color picture tube in accordance with said electrical signals.

Furthermore, it is also possible that the principle of controlling the white balance in accordance with the present invention may be applied not only to a color television receiver of such a system that the color picture tube is driven directly by signals R, G and B instead of by the signals Y, (R—Y), (G—Y) and (B—Y), but also to a television receiver using another picture tube than the shadow-mask-type one.

In the foregoing, description has been made of the case where the white balance controlling reference illumination is a constant white luminance signal produced by the clamping circuits, but it is also possible to accurately control the color balance over a wider range by periodically changing the magnitude of the luminance signal to achieve a uniform white balance from the black level to the white level. In such case, the DC components of the light rays filtered by the respective color filters may be used to control the average color balance, while the AC components may be employed to control the amplification factor of the video amplifier including the color picture tube circuit. However, the selection is optional whether the control should be effected by the use of both or either one of the DC and AC components.

I claim:

1. A color television receiver comprising a color picture tube with a phosphor screen, a television signal receiving circuitry having a video circuit means, a primary color filter means and a photosensitive means optically associated with said filter means, wherein said video circuit means includes means for producing a white balance controlling reference light emission on a part of said phosphor screen in a timed relation with a scanning signal associated with said television signal, said reference light emission being representative of the state of the color tone of a color image being viewed and being directed through said filter means to said photosensitive means, and means for feeding the output of said photosensitive means back to said video circuit means.

2. A color television receiver according to claim 1, wherein said photosensitive means is formed by photosensitive resistors.

3. A color television receiver according to claim 1, wherein said photosensitive means is formed by photosensitive means if formed by phototransistors.

4. A color television receiver according to claim 1, wherein said photosensitive means if formed by photodiodes.

5. A color television receiver according to claim 1, wherein said photosensitive means constitutes means for controlling the amplification factor of video amplifier means in said video circuit.

6. A color television receiver according to claim 1, wherein said photosensitive means comprises means for controlling the bias for video amplifier means in said video circuit, which amplifier means is DC coupled to the cathode or grids of said color picture tube.

7. A color television receiver according to claim 1, wherein said photosensitive means is formed by photosensitive resistors which are connected with the grids or cathodes of the color picture tube so as to serve as bias voltage divider resistors.

8. A color television receiver according to claim 1, wherein said white balance controlling reference light emission producing means includes clamping circuit means for respectively clamping red-, green- and blue-color difference signals and a luminance signal to a predetermined DC level simultaneously for the same period of time.

9. A color television receiver according to claim 8, wherein said predetermined DC level producing means causes a white color emission on said part of said phosphor screen.

10. A color television receiver according to claim 1, wherein said white balance controlling reference light emission producing means includes means for periodically varying the amplitude of a signal corresponding to said reference light emission such that a uniform white balance control is attained in the range from the black level to the white level.

11. A color television receiver according to claim 1, further comprising means for actuating said white balance controlling reference light emission producing means, wherein said actuating means includes circuit means responsive to a vertical or horizontal flyback pulse signal or a vertical or horizontal sync signal.